(12) United States Patent
Mallick et al.

(10) Patent No.: US 9,210,642 B2
(45) Date of Patent: Dec. 8, 2015

(54) METHOD AND SYSTEM FOR COMPUTING AND SENDING RESOURCE REQUESTS AND AVOIDING DEADLOCK SITUATIONS IN MOBILE COMMUNICATION SYSTEM

(75) Inventors: Prateek Basu Mallick, Karnataka (IN); Vinay Kumar Shrivastava, Karnataka (IN)

(73) Assignee: Samsung Electronics Co., Ltd. (KR)

( * ) Notice: Subject to any disclaimer, the term of this patent is extended or adjusted under 35 U.S.C. 154(b) by 188 days.

(21) Appl. No.: 12/696,784

(22) Filed: Jan. 29, 2010

(65) Prior Publication Data

US 2010/0189006 A1 Jul. 29, 2010

(30) Foreign Application Priority Data

Jan. 29, 2009 (IN) .............................. 212/CHE/2009

(51) Int. Cl.
*H04W 36/38* (2009.01)
*H04W 72/04* (2009.01)

(52) U.S. Cl.
CPC ........ *H04W 36/385* (2013.01); *H04W 72/0486* (2013.01)

(58) Field of Classification Search
CPC ...... H04L 47/10; H04W 36/08; H04W 36/26; H04W 36/36; H04W 36/385; H04W 72/0486
USPC .............. 370/229, 230, 230.1, 231, 235, 241, 370/252, 464, 465, 470, 474, 310, 345, 370/349; 455/403, 422.1, 450, 452.1
See application file for complete search history.

(56) References Cited

U.S. PATENT DOCUMENTS

| 2004/0033801 A1 | 2/2004 | Yi et al. |
| 2005/0074024 A1 | 4/2005 | Kim et al. |
| 2007/0014274 A1 | 1/2007 | Choi |
| 2009/0052420 A1* | 2/2009 | Fischer ......................... 370/338 |

(Continued)

FOREIGN PATENT DOCUMENTS

| CN | 1695354 | 11/2005 |
| CN | 1833413 | 9/2006 |

(Continued)

OTHER PUBLICATIONS

Ericsson: "Buffer Status Report Calculation", 3GPP Draft, R2-080298, TSG-RAN WG2 Meeting #60bis, Jan. 5-9, 2008.

(Continued)

*Primary Examiner* — Obaidul Huq
(74) *Attorney, Agent, or Firm* — The Farrell Law Firm, P.C.

(57) ABSTRACT

A method and system for requesting resources to send data packets in a mobile communication system is provided. The method includes calculating a size of a Robust Header Compression (ROHC) feedback packet associated with data packets available for transmitting, creating a Buffer Status Report (BSR) based on the number of data packets available for transmitting and the size of the ROHC feedback packet, sending the BSR to a first network element to allocate resources for the UE for sending the data packets available for transmitting along with ROHC feedback packet and identifying a size of a Packet Data Convergence Protocol (PDCP) status report when a handover procedure is performed. The BSR is estimated based on the size of the PDCP status report, the number of data packets available for transmitting and the size of the ROHC feedback packet.

8 Claims, 3 Drawing Sheets

(56) References Cited

U.S. PATENT DOCUMENTS

| | | | |
|---|---|---|---|
| 2009/0286541 A1* | 11/2009 | Maheshwari et al. | 455/436 |
| 2009/0296637 A1* | 12/2009 | Fischer | 370/328 |
| 2010/0074168 A1* | 3/2010 | Wu | 370/328 |
| 2010/0135166 A1* | 6/2010 | Ahluwalia | 370/252 |
| 2010/0329135 A1* | 12/2010 | Pelletier et al. | 370/252 |
| 2011/0164587 A1* | 7/2011 | Seo | 370/329 |

FOREIGN PATENT DOCUMENTS

| | | |
|---|---|---|
| EP | 1 903 820 | 3/2008 |
| EP | 1 986 455 | 10/2008 |
| WO | WO 2008/115447 | 9/2008 |

OTHER PUBLICATIONS

3rd Generation Partnership Project; Technical Specification Group Radio Access Network; Evolved Universal Terrestrial Radio Access (E-UTRA); Packet Data Convergence Protocol (PDCP) Specification (Release 8), 3GPP TS 36.323 V8.4.0, Dec. 1, 2008.

European Search Report dated Nov. 19, 2014 issued in counterpart application No. 10736008.3-1857.

* cited by examiner

METHOD AND SYSTEM FOR COMPUTING AND SENDING RESOURCE REQUESTS AND AVOIDING DEADLOCK SITUATIONS IN MOBILE COMMUNICATION SYSTEM

PRIORITY

This application claims priority to a provisional application entitled "METHOD AND SYSTEM FOR COMPUTING AND SENDING RESOURCE REQUESTS AND AVOID DEADLOCK SITUATIONS IN MOBILE COMMUNICATION SYSTEM" filed in the Indian Patent Office on Jan. 29, 2009 and a complete application filed in the Indian Patent Office on Jan. 19, 2010, and both of which are assigned Serial No. 212/CHE/2009, the contents of which are incorporated herein by reference.

BACKGROUND OF THE INVENTION

1. Field of the Invention

The present invention relates generally to a wireless communication system, and more particularly, to a resource request procedure in a wireless communication system.

2. Description of the Related Art

Several generations of communication networks, such as radio communication systems, have been developed to this point. Such radio communication systems include the First Generation system (1G), Second Generation system (2G), Third Generation system (3G) and Fourth Generation system (4G). Each generation has different transmission characteristics and communication technologies.

The 1G systems, such as Advanced Mobile Phone System (AMPS), and Total Access Communications System (TACS), is based on analog frequency modulation technology. The 2G system, such as Global System for Mobile communications (GSM), is based on Time Division Multiple Access (TDMA). The 3G systems, such as Universal Mobile Telecommunications System (UMTS) and GSM Evolution (EDGE), are based on a Wideband Code Division Multiple Access (WCDMA) air interface. The 4G system is an International Telecommunication Union (ITU) specification that is presently being developed for broadband mobile capabilities. The 4G system would enable Internet Protocol (IP) packet-based voice data and streaming multimedia at higher speeds than with the 3G system. Transmission resources in the 4G wireless communication systems are shared among many users, such as mobile phones or User Equipments (UEs). Therefore, the data availability for transmission is reported by the UE to network element, such as an evolved (e) NodeB, to receive transmission resources (corresponding grants) from the network for the actual transmission of the data. The report is called a Buffer Status Report (BSR).

However, for calculating BSR, the data that arrives from higher layers in a protocol stack are accounted for transmission. As such, no consideration is given in the BSR for packets generated at other layers. Further, a Packet Data Convergence Protocol (PDCP) status report that is capable of preventing the occurrence of data loss is also not considered for BSR. The PDCP status report conveys to the peer entity the reception status of the PDCP Protocol Data Units (PDU) following a handover.

The application or upper layer data packet termed as Service Data Units (SDU) is processed at the PDCP layer, and the resultant data packet formed is termed a PDU. The PDCP status report carries information indicating whether reception of the PDUs is successful. For example, the PDCP report includes information about the PDU(s) that have been received successfully and the PDU(s) that were not received or were missing, thus needing retransmission. Hence, the size of the PDCP status report is variable.

Thus, during handover, a peer entity (network) performs transmissions and retransmissions on the basis of the PDCP status report to achieve a lossless handover. Therefore, the PDCP status report should also be considered for BSR. Currently, the PDCP report is not considered for computing data availability for transmission, and as such, the reported BSR conveyed to the network is not accurate enough.

A network element computes on the basis of the received BSR and provides grants to the UE. The grants provided would not match the actual transmission requirements at the UE. There may be a case in which some data may incur a delay in transmission until sufficient grants are subsequently received. When there is no application or upper layer data existing, the existing method would send a BSR conveying zero value. However, there may be PDCP status report available which needs to be transmitted.

Therefore, when no user data is available, the BSR report makes no requirements and thus, no grant is fetched. Hence, a PDCP status report cannot be transmitted. The PDCP Status Report is mandated as the first UpLink (UL) packet (in some access technologies) after the handover; therefore, absence of a grant to send the status report will result in a deadlock situation.

This deadlock cannot be broken until some new user data or application data arrives. However, any delay in transmission of a PDCP status report in UL would cause the Down-Link (DL) to also suffer, and the network would not perform timely transmissions and retransmissions. When the network element discovers a zero requirement BSR, it may discard the packets which otherwise would need to be re-transmitted to the UE based on its PDCP Status Report, thus incurring packet losses on the bearer.

Also, to achieve a desired Quality of Service (QoS), the network element limits the maximum delay in transmitting the upper layer. Thus, application data is subject to an expiration of the discard timer, and the corresponding user data is discarded. During handover scenarios, it is likely that the upper layer data, which was available before handover, gets discarded after handover completion based on the discard timer(s) expiration. The timing values for discard timers and handover procedure completion are comparable.

Although the header compression feedback related control information is generated at the PDCP layer, there would be a mismatch in actual transmission resource requirement and the reported BSR (and thereby the allocated grant), as the header compression feedback related control information is not accounted for BSR, resulting in transmission delay of some data. Another adverse effect is that the data packets would undergo an undesired segmentation/re-segmentation for requesting of a sufficient grant, thereby leading to increased processing complexity and inefficiency at the UE.

Hence, there exists a need for a method to efficiently manage resource requirements in the mobile communication network.

SUMMARY OF THE INVENTION

An embodiment of the present invention discloses a method at a User Equipment (UE) for requesting resources to send data packets in a mobile communication system. The method identifies an amount of data packets available for transmitting to a first network element, calculates a size of a RObust Header Compression (ROHC) feedback packet associated with the data packets available for transmitting to the first network element, creates a BSR based on the amount of data packets available for transmitting and the size of the ROHC feedback packet, and sends the BSR to the first network element to allocate resource(s) for the UE for sending the data packets available for transmitting along with ROHC feedback packet.

Another embodiment discloses a method at a UE for requesting resources to send data packets in a mobile communication system. The method performs a handover procedure from a first network element to a second network element, identifies a size of a PDCP status report based on the handover procedure, prepares a BSR based on the PDCP status report and available data packets, and sends the BSR to the second network element when the UE performs the handover procedure from the first network element to the second network element.

In a further embodiment, including a UE having a processor and transceiver, the processor identifies an amount of data packets available for transmitting to a first network element, calculates size of an ROHC feedback packet associated with the data packets available for transmitting to the first network element, and creates a BSR based on the amount of data packets available for transmitting and the size of the ROHC feedback packet. The transceiver then sends the BSR to the network element to allocate resource(s) for the UE for sending the data packets available for transmitting along with ROHC feedback packet.

In still another embodiment, a processor of a UE performs a handover procedure from a first network element to a second network element, identifies a size of the PDCP status report based on the handover procedure, and prepares buffer status report based on a PDCP status report and available data packets. The transceiver then sends the buffer status report to the second network element when the UE performs the handover procedure from a first network element to the second network element.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Persons skilled in the art will appreciate that elements in the FIG. is illustrated for simplicity and clarity and may have not been drawn to scale. For example, the dimensions of some of the elements in the figure may be exaggerated relative to other elements to help to improve understanding of various embodiments of the present disclosure.

DETAILED DESCRIPTION OF EMBODIMENTS
OF THE INVENTION

Before the DETAILED DESCRIPTION OF THE INVENTION is given, the following definitions of certain words and phrases used throughout this patent document are set forth.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, and those of ordinary skill in the art should understand that in many, if not most instances, such definitions apply to prior, as well as future uses of such defined words and phrases.

Those skilled in the art will understand that the principles of the present disclosure may be implemented in any suitably arranged communications system. The terms used to describe various embodiments are provided to merely aid the understanding of the description, and their use and definitions in no way limit the scope of the invention. Terms first, second, and the like are used to differentiate between objects having the same terminology and are not intended to represent a chronological order, as and where stated otherwise. Detailed descriptions of well-known functions and structures incorporated herein may be omitted for the sake of clarity and conciseness.

Figure 1:
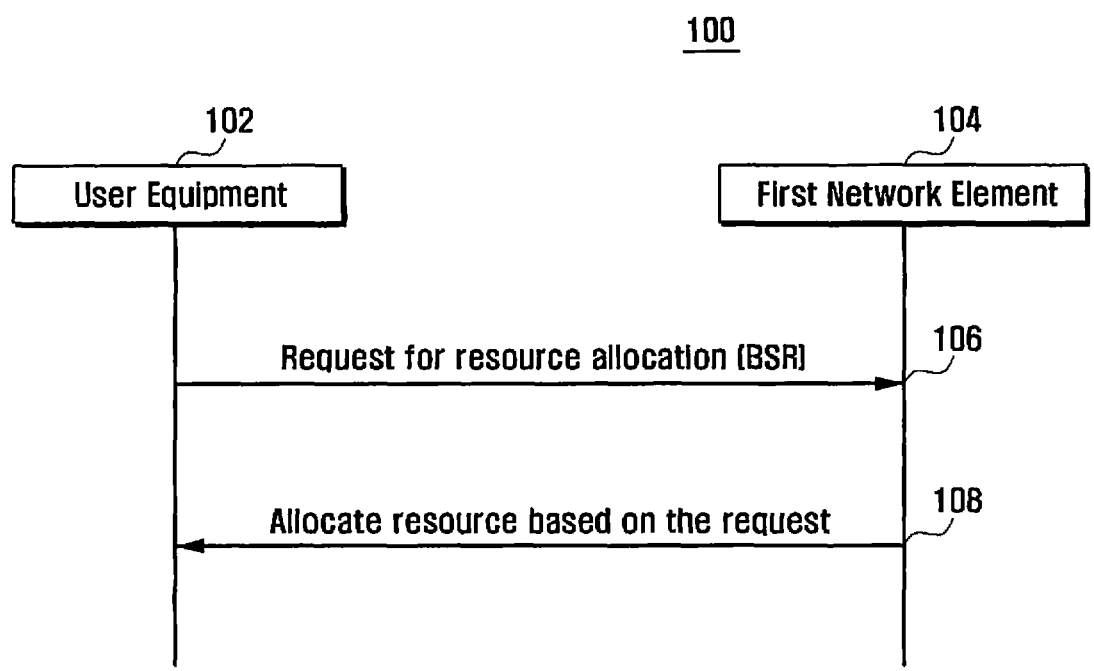
FIG. 1 illustrates an environment, in which various embodiments of the present invention may be practiced.

FIG. 1 illustrates an environment 100 in which various embodiments of the present invention may be practiced. The environment 100 includes a UE 102 and a first network element 104 in a 4G mobile communication network 100. Although a 4G network is described, the present invention is not limited thereto. The environment 100 can also include a greater or lesser number of system elements to perform the method.

In the environment 100, at step 106 an amount of data packets available for transmission is reported by the UE 102 to the first network element 104 in a request for resource allocation. Examples of the network element include, but are not limited to, eNodeB, Base Transceiver Station (BTS) and Radio Network Controller (RNC). Therefore, the amount of data packets available for transmission is reported by the UE 102 (mobile phone), through a BSR, to the first network element 104 (eNodeB) to receive corresponding grants (transmission resources) from the first network element 104 for an actual transmission of the data packets.

The BSR is calculated based on the data packets that are received for transmission from higher layers, the data packets generated at other layers, and ROHC feedback. In an embodiment, a PDCP status report that is capable of preventing occurrence of data loss is also considered for the BSR. The PDCP status report conveys to a peer entity a reception status of the PDCP data, such as PDUs, following the handover.

In an embodiment, the amount of data packets is calculated based on the amount of Service Data Units (SDUs), the amount of PDUs and the size of an ROHC feedback. The SDUs are the data packets sent by a user of the services of a given layer and are available for transmission. The SDUs are processed at a PDCP layer to form packet data and are termed as PDUs. For calculating the BSR, both PDUs and SDUs are considered. The data packets available for transmission at the PDCP layer are computed and are considered in the BSR. In an embodiment, the SDUs at the PDCP layer are considered in the BSR, if PDUs for the corresponding SDU have not been submitted to lower layers and/or if the SDUs have not been processed by PDCP. The PDU are considered if the SDU has been processed at the PDCP layer.

The control information generated at the layer, for example header compression control information, is considered as data available for transmission in the PDCP layer. When a handover occurs, the PDCP layer receives an indication from upper layer that a handover has occurred, and the SDUs are identified for which a corresponding PDU has been submitted to lower layers prior to handover and the successful delivery associated with the SDU that has not been confirmed by lower layers or by a PDCP status report. The SDUs are then considered if the SDU has not been processed at the PDCP layer. The PDU are considered in the BSR if the SDUs have been processed by PDCP. Thus if the PDCP status report is available, the PDCP status report is also considered as data available for transmission in the PDCP layer.

Thereafter, the first network element 104 computes on the basis of the received BSR report and provides grants to the UE 102 at step 108. Thus the PDCP Status report and ROHC feedback are also considered in the BSR as data available for transmission. The method provides an enhanced and accurate reporting of the data availability for the transmission. Consequently, an improved match is created between the actual transmission resource requirement and the reported BSR (and thereby the allocated grants). Thus a possibility of deadlock in handover scenarios is avoided by including PDCP status report in the reported BSR.

Figure 2:
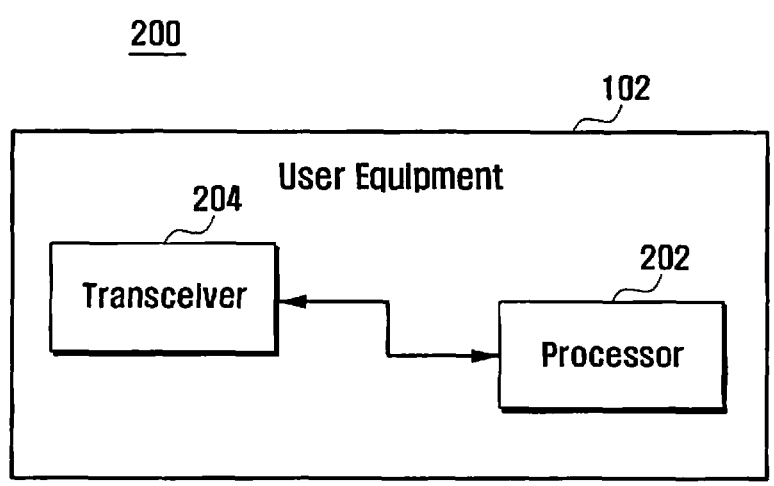
FIG. 2 illustrates a first network element, in accordance with an embodiment of the present invention.

FIG. 2 illustrates a UE, in accordance with an embodiment of the present invention. Although references will be made to FIG. 1, it will be apparent to a person ordinarily skilled in the art that the embodiment of FIG. 2 can be explained with the help of any other suitable embodiment of the present invention. The UE 102 includes a processor 202 and a transceiver 204.

The processor 202 in the UE 102 identifies an amount of data packets available for transmitting to a first network element. The data packets include SDUs and PDUs. The processor 202 then calculates size of an ROHC feedback packet associated with the data packets available for transmitting to the first network element 104. The ROHC is a standardized method to compress the Internet Protocol (IP), User Datagram Protocol (UDP), and Transmission Control Protocol (TCP) headers of Internet packets.

The processor 202 creates a BSR based on the amount of data packets available for transmitting and the size of the ROHC feedback packet. The transceiver 204 thereafter sends the BSR created by the processor 202 to the first network element 104 to allocate resource(s) for the UE 102 for sending the data packets available for transmitting along with ROHC feedback packet.

The processor 202 performs handover procedures when the UE 102 moves from the first network element 104 to the second network element. Thereafter, the processor 202 identifies a size of a PDCP status report based on the handover procedure, and prepares a buffer status report based on the PDCP status report and available data packets. Thereafter, the transceiver 204 sends the buffer status report to the second network element when the UE 102 performs the handover procedure from a first network element 104 to the second network element.

Figure 3:
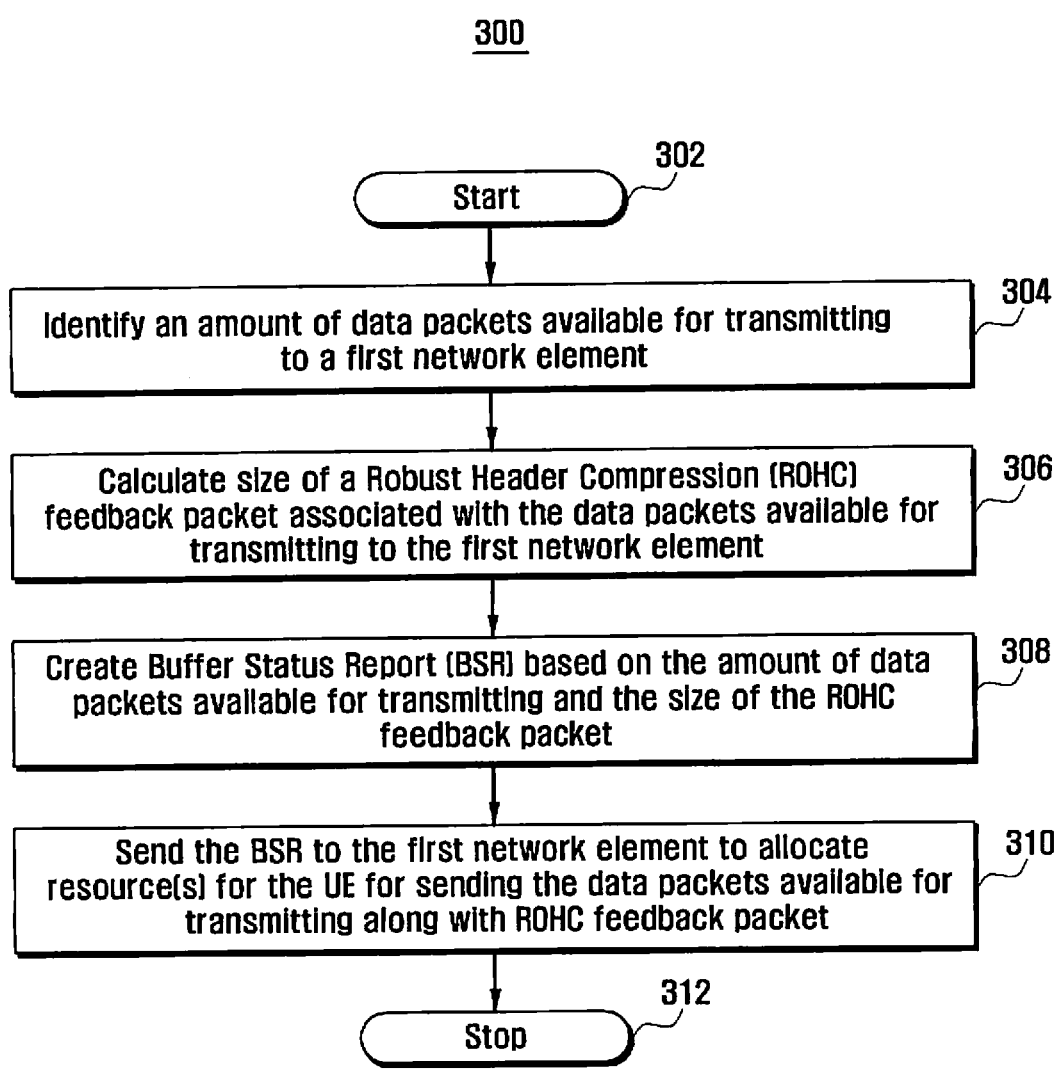
FIG. 3 illustrates a method for requesting resources to send data packets in a mobile communication system, in accordance with a first embodiment of the present invention.

FIG. 3 illustrates a method at a UE for requesting resources to send data packets in a mobile communication system, in accordance with a first embodiment of the present invention.

Examples of mobile communication systems in FIG. 3 include, but are not limited to, Long Term Evolution (LTE) system, Universal Mobile Telecommunications System (UMTS), 3rd Generation Partnership Project (3GPP) and Worldwide Interoperability for Microwave Access (WiMax) systems. In the environment 100, the mobile communication system is a $4^{th}$ Generation mobile communication system.

Hence, in an environment 100, the UE 102 is a mobile device and the first network element 104 is eNodeB.

At step 302, the method 300 is initiated. At step 304, the UE 102 identifies an amount of data packets available for transmitting to a first network element, such as the first network element 104. Examples of the first network element are NodeB, eNodeB, Base Transceiver Station (BTS), and Radio Network Controller (RNC). The data packets include SDUs and/or PDUs. The SDU is a data packet that arrives at a certain layer for processing by a said layer. The processed data packet is a PDU and is passed on to the layer underneath the said layer. In an embodiment, the header of the data packets available for transmitting to the first network element 104 is compressed before sending. The compression of the data packets available is performed at a PDCP layer.

At step 306, the method calculates size of an ROHC feedback packet associated with the data packets available for transmitting to the first network element 104. The ROHC technique is used to compress headers of the data packets (SDU and PDU) available for transmitting to the first network element 104. At step 308, the method 300 creates a BSR based on the amount of data packets available for transmitting and the size of the ROHC feedback packet.

At step 310, the BSR is sent to the first network element 104 to allocate resource(s) to the UE 102 for sending the data packets available for transmitting along with ROHC feedback packet. The BSR is sent to the second network element when the UE performs a handover from the first network element 104 to a second network element. The method of FIG. 3 identifies a size of the PDCP status report based on the handover procedure. The BSR is estimated based on the size of the PDCP status report, the amount of data packets available for transmitting and the size of the ROHC feedback packet. At step 312 the method is terminated.

Figure 4:
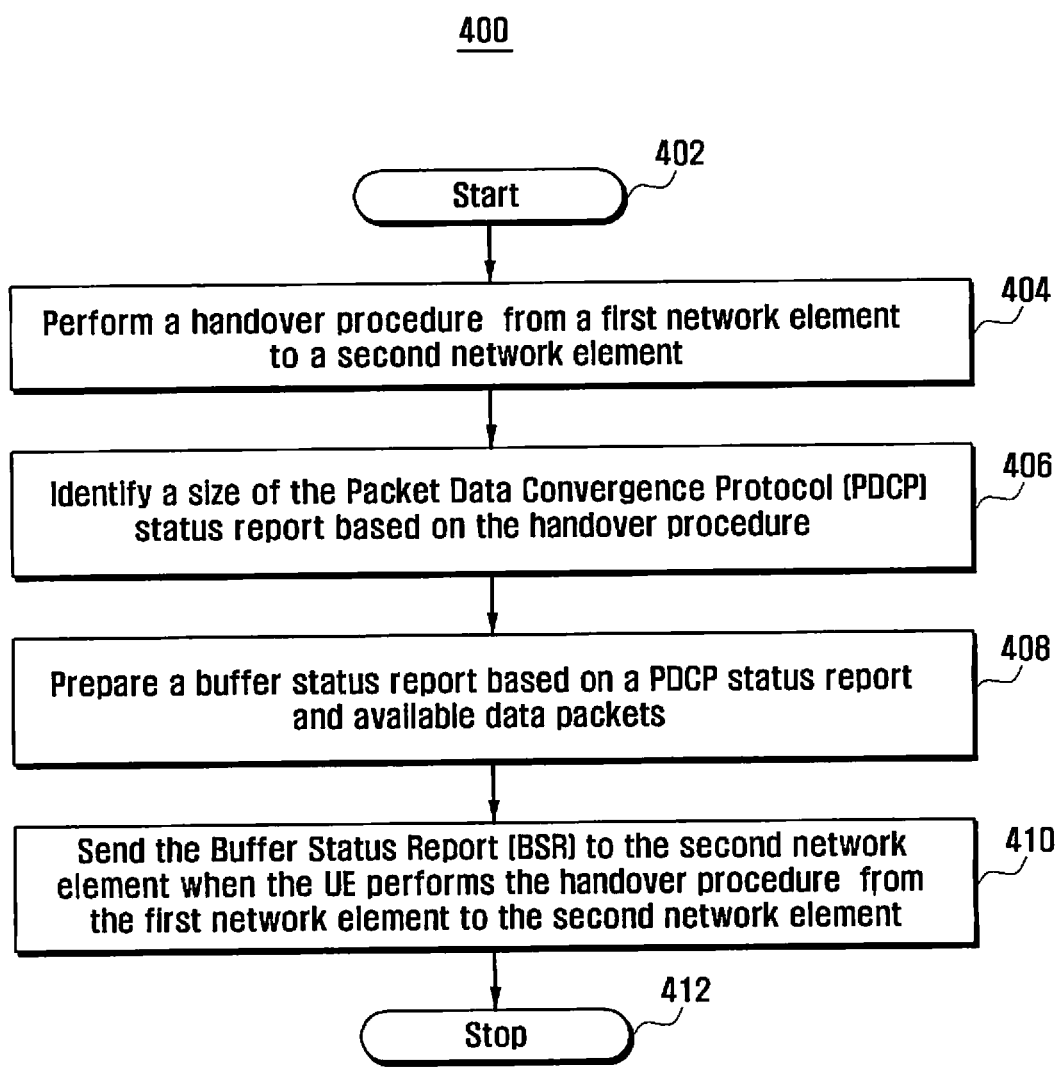
FIG. 4 illustrates a method for requesting resources to send data packets in a mobile communication system, in accordance with a second embodiment of the present invention.

FIG. 4 illustrates a flow chart depicting a method at a UE for requesting resources to send data packets in a mobile communication system, in accordance with a second embodiment of the present invention.

At step 402 the method is initiated. At step 404, a handover procedure is performed from the first network element 104 to a second network element, both of which being an eNodeB. During the handover, the data packets information is transferred from the first network element to the second network element. The data packets are at least one of SDUs and PDUs.

At step 406, a size of the PDCP status report is identified based on the handover procedure. The PDCP status report includes information indicating whether reception of PDU(s) at the second network element is successful. For example, the PDCP report includes information about the PDU(s) that have been received successfully, and the PDU(s) that were not received or were missing, thus requiring a retransmission. Hence, the size of the PDCP status report is variable.

At step 408, a buffer status report is prepared based on a PDCP status report and available data packets. The inclusion of PDCP status report size in the BSR provides the UE 102 with a resource grant which is used to transmit PDCP status report even in absence of user data, thereby avoiding a deadlock situation when no resource and transmission occurs.

At step 410, the BSR is sent to the second network element when the UE 102 performs handover from the first network element 104 to the second network element. The PDCP status report is sent via UL as a first packet to the second network element, after or during a handover procedure. At step 412 the method is terminated.

As described above, the foregoing embodiments of the present invention provide an efficient method for requesting resources to send data packets in a mobile communication system. A method calculates an appropriate BSR for requesting resources. Hence, the method increases accuracy of the reported BSR. A method provides an enhanced and accurate method of reporting data availability for transmission, and enhances BSR accuracy by introducing the PDCP Status report and ROHC feedback.

A method mandates transmission of the PDCP status report as the first UL packet following a handover and thereafter the upper layer or application data packets are transmitted. Hence, in the absence of upper layer data during handover scenario reports, the BSR accounts for only an available status report and avoids any deadlock possibility in handover scenarios. The method achieves speedy and lossless handover in the mobile communication system, and avoids a delay in transmission and retransmissions.

The present invention and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Embodiments of the present disclosure are related to the use of the computer system for implementing the techniques described herein. In an embodiment, the techniques are performed by the processor by using information included in the memory. Such information can be read into the main memory from another machine-readable medium, such as storage device. The information included in the memory causes the processor to perform the method described herein.

The term "machine-readable medium" as used herein refers to any medium that participates in providing data that causes a machine to operation in a specific fashion. In one embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fiber optics, including the wires that include bus. Transmission media can also take the form of acoustic or light waves, such as those generated during radio-wave and infrared data communications. Examples of machine-readable medium may include, but are not limited to, a carrier wave as or any other medium from which a computer can read, for example online software, download links, installation links, and online links.

What is claimed is:

1. A method for transmitting a buffer status report (BSR) by a user equipment (UE) performing a handover procedure from a first network element to a second network element in a mobile communication system, the method comprising:
   identifying a data packet available for transmitting and packet data convergence protocol (PDCP) control information;
   generating a BSR based on the data packet and the PDCP control information, the PDCP control information including robust header compression (ROHC) feedback information associated with the data packet available for transmitting and a PDCP status report indicating whether reception of a PDCP protocol data unit (PDU) is successful;
   transmitting the generated BSR to the second network element,
   wherein the PDCP status report is transmitted to the second network element based on the BSR as a first PDCP PDU after the UE performs the handover procedure.

2. The method of claim 1, wherein the data packet is at least one of service data units (SDUs) and PDUs.

3. The method of claim 1, wherein the first network element is an evolved node b (eNodeB).

4. The method of claim 1, wherein the mobile communication system is a long term evolution (LTE) system.

5. A user equipment (UE) for transmitting a buffer status report (BSR) performing a handover procedure from a first network element to a second network element in a mobile communication system, the UE comprising:
   a processor for identifying a data packet available for transmitting and packet data convergence protocol (PDCP) control information, generating BSR based on the data packet and the PDCP control information, the PDCP control information including robust header compression (ROHC) feedback information associated with the data packet available for transmitting and a PDCP status report indicating whether reception of a PDCP protocol data unit (PDU) is successful, and transmitting the generated BSR to the second network element; and
   a transceiver for transmitting the determined BSR to a first network element,
   wherein the PDCP status report is transmitted to the second network element based on the BSR as a first PDCP PDU after the UE performs the handover procedure.

6. The UE of claim 2, wherein the data packet is at least one of service data units (SDUs) and PDUs.

7. The UE of claim 2, wherein the first network element is an evolved node b (eNodeB).

8. The UE of claim 2, wherein the mobile communication system is a long term evolution (LTE) system.

* * * * *

UNITED STATES PATENT AND TRADEMARK OFFICE
CERTIFICATE OF CORRECTION

PATENT NO.         : 9,210,642 B2
APPLICATION NO.    : 12/696784
DATED              : December 8, 2015
INVENTOR(S)        : Mallick et al.

It is certified that error appears in the above-identified patent and that said Letters Patent is hereby corrected as shown below:

On the title page item [30], insert

-- Jan. 29, 2009   (IN) ...............................212/CHE/2009 PS
   Jan. 19, 2010   (IN) ...............................212/CHE/2009 CS --

Signed and Sealed this
Twenty-ninth Day of March, 2016

Michelle K. Lee
*Director of the United States Patent and Trademark Office*